Basil D. Power,
INVENTOR 2,902,210
United States Patent Office    Patented Sept. 1, 1959

2,902,210
MULTI-STAGE MECHANICAL VACUUM PUMPS

Basil D. Power, Crawley, England, assignor to Edwards High Vacuum Limited, Crawley, England, a British company Application July 30, 1956, Serial No. 601,025

Claims priority, application Great Britain August 15, 1955

6 Claims. (Cl. 230—205)

The present invention relates to multi-stage mechanical vacuum pumps of the type in which a lubricant is employed for lubricating and sealing the working surfaces of the pump.

In mechanical vacuum pumps of the type referred to, the lubricant is commonly contained in an external reservoir from which a suitable flow of lubricant is fed to the pump and to which the lubricant is returned from the pump. The lubricant ideally comprises an oil which is suitable both for lubricating and for vacuum sealing. In practice when the oil enters regions of the pump where low pressure exists, gases dissolved in the oil may come out of solution, and vapours may be given off by any volatile constituents of the oil, and these gases and vapours may have a significant effect on the ultimate vacuum (or lowest pressure) that the pump can produce. It is obvious that the adverse effect of such gases and vapours will be most serious if they are liberated in the high vacuum stage of a multi-stage pump.

Multi-stage pumps of the type referred to are therefore frequently arranged so that the lubricant is fed first to the low vacuum stage, where some degree of stripping of gases and volatiles takes place at low vacuum, and a small proportion of the partially purified oil is then allowed to find its way (usually along the common centre bearing of the two stages in the case of a two stage pump) into the high vacuum stage to lubricate and seal it—the lubricant being subsequently returned from the high vacuum stage through the low vacuum stage to the reservoir along the same route as the air being pumped. There is thus a main circulation of oil from the reservoir into the low vacuum stage and thence back to the reservoir, and a subsidiary circulation of oil from the reservoir to the low vacuum stage, through the high vacuum stage, back to the low vacuum stage, and back to the reservoir. In this manner it is possible to obtain much lower ultimate pressures in the pump, but still there is a continuous feed of oil into the high vacuum stage carrying some dissolved gases and volatiles not liberated in the rough vacuum of the low vacuum stage but which are liberated in the high vacuum stage. Great care is therefore necessary to reduce as far as possible the oil feed to the high vacuum stage and even with this precaution the vacuum achieved is not so high as it would be if traces of volatiles and dissolved gas were not continuously entering the high vacuum stage.

It has heretofore been proposed in the case of two stage pumps to prevent entirely any flow of oil into the high vacuum stage whilst the pump is running. The high vacuum stage relies for lubrication and sealing on oil introduced before the pump is started (for instance by arranging for oil from the reservoir to drain into the pump interior under static conditions) and this small high-vacuum stage oil charge is not replaced or replenished in any way whilst the pump is running. High ultimate vacua can certainly be obtained with this arrangement, as the small high vacuum stage oil charge is continuously purified by the pumping action of the pump and there is no continuous flow of contaminants into the stage, but there are however certain obvious risks involved in using this arrangement. Under certain pumping duties (where considerable quantities of air or gas are being pumped, or where the pump must run for long periods continuously) there is a danger that sufficient oil will be lost from the high vacuum stage to the low vacuum stage for the high vacuum stage to become short of oil and to suffer damage or seizure.

According to the present invention a multi-stage mechanical vacuum pump employing a sole liquid for lubricating and sealing the working surfaces of the pump, is provided with means for segregating a discrete quantity of the liquid in one stage of the pump other than the highest pressure stage of the pump, and for circulating the said discrete quantity through the said one stage to provide a lubricating and sealing liquid therefor, and means for automatically replenishing loss in the said discrete quantity.

Thus in the pump according to the invention, the discrete quantity of lubricant is continuously circulated and re-circulated through the stage and becomes progressively purified, and since additional lubricant is admitted to the stage only when it is necessary to make good any loss of lubricant, there is no continuous influx of contaminants.

One construction of two-stage mechanical vacuum pump according to the invention will now be described with reference to the accompanying drawings in which.

Figure 1:
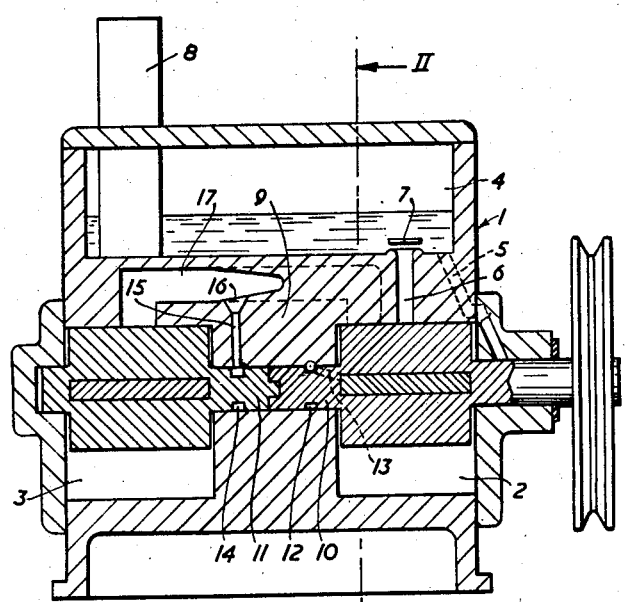
Figure 1 is a longitudinal section taken along the line I—I of Figure 2.
Figure 2:
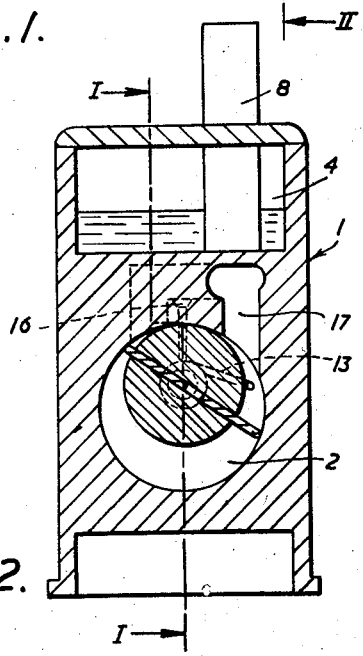
Figure 2 is a transverse section taken along the line II—II of Figure 1.

As will be seen from the drawings the pump comprises a housing 1 in which is positioned a pair of axially aligned crescent-chamber vane type pumps 2 and 3 constituting the low vacuum stage i.e. the highest pressure stage, and the high vacuum stage respectively of the pump. The housing 1 also provides a reservoir 4 above the pumps for the lubricating and sealing oil.

Oil ducts one of which is shown at 5 (Figure 1) extend downwardly from the reservoir to selected points of the low vacuum stage of the pump and oil flowing down the said ducts is circulated in the low vacuum stage of the pump and is ejected therefrom through an upwardly extending outlet duct 6 leading to the reservoir through a non-return outlet valve 7 and through which the gases being pumped from an inlet pipe 8 are also discharged through the reservoir to an outlet (not shown).

A centre bearing 9 receives the opposed end shafts 10 and 11 respectively of the two pumps, which shafts are suitably coupled, and each shaft is provided with a peripheral oil groove. The oil groove 12 in the end shaft 10 of the low vacuum stage communicates by means of a vent duct 13 extending through the stator of the pump with a region of the pump where the pressure is equal to the interstage pressure. The oil groove 14 in the end shaft of the high vacuum stage registers with a duct 15 extending upwardly through the bearing 9 and terminating in a small sump 16 formed in a transfer duct 17 between the low vacuum stage and high vacuum stage, which transfer duct is of course at interstage pressure and is arranged a substantial distance above the centre bearing.

There is thus provided a first path for circulating the lubricating and sealing oil between the low and high vacuum stages and constituted by the pump 2, an oil flow passage formed by the clearance between the bearing 9 and the end shafts 10 and 11, the pump 3 and the transfer duct 17; and a second path for circulating the oil through the pump 3 only and constituted by the duct 15, the portion of the bearing 9 between the duct 15 and the pump 3, the pump 3 and the portion of the transfer duct 17 between the pump 3 and the sump 16. The duct 15 provides a connecting means between the first and second paths and as will be hereinafter described, the oil is caused to flow into the duct 15 to create a pressure gradient along the bearing 9 which prevents the flow of oil along the bearing from the pump 2 to the pump 3.

When the pump is started oil in the low vacuum stage which is at a pressure intermediate atmospheric pressure and the interstage pressure, migrates along the end shaft 10 in a direction towards the high vacuum stage. Upon the migrating oil reaching the oil groove 12 providing a first pressure region along the said oil flow passage its pressure is reduced approximately to interstage pressure due to the duct 13 communicating the said groove with a region of the low vacuum stage which is at interstage pressure and some de-gassing and purging of volatiles in the oil in the groove 12 will take place through the duct 13.

The oil will however continue to flow through the centre bearing, past the groove 14 in the end shaft 11 of the high vacuum stage, into the high vacuum stage where it is circulated and finally thrown out into the transfer duct 17 where it begins to flow back towards the low vacuum stage.

In so flowing back, the oil reaches the sump 16 and the oil flows down into the duct 15 where it will tend to accumulate and build up a standing head of oil above the groove 14 providing a second pressure region along the said oil flow passage.

The pressure of oil in the groove 14 will thus be approximately equal to the interstage pressure which exists in the transfer duct 17, plus the pressure due to the head of oil in the duct 15 leading from the sump 16, and the pressure of oil in the groove 14 will therefore exceed that of the oil in the groove 12 and the flow of oil along the centre bearing from the low vacuum stage to the high vacuum stage will cease. As the pump continues to operate therefore the oil in the high vacuum stage will circulate from the groove 14 along the end shaft 11, into the stage, through the transfer duct 17 to the sump 16 therein and downwardly through the registering duct 15, back to the oil groove 14. A discrete quantity of oil is thus segregated and circulated continuously through the high vacuum stage and in so doing becomes progressively more free of gas and volatiles due to the purging action of the high and interstage vacuum.

As long as the head of oil is maintained in the duct 15 no further oil will be introduced from the low vacuum stage along the centre bearing to the high vacuum stage. If however there is a loss of oil circulating in the high vacuum stage due for example to gas at comparatively high pressure being pumped through the pump and carrying with it some oil into the low vacuum stage, the head of oil in the duct 15 and groove 14 will be reduced and oil will commence to flow again through the centre bearing from the low vacuum stage to the high vacuum stage until the head of oil is built up again sufficiently to raise the pressure in the oil groove 14 to that of the oil groove 12 to prevent further migration of oil along the shafts.

The action in this regard will be self-evident to one skilled in the art, but for completeness the known principles involved may be briefly stated as follows:

(a) If oil is fed continually onto one end of a freely revolving steel shaft, a film of oil travels very rapidly along the shaft, due to a surface affinity between oil and shaft which encourages the oil to wet and creep, assisted by the spinning action which encourages uniform spread.

(b) If two metal surfaces have a very small clearance between them so that they constitute a very narrow two dimensional duct, then oil supplied at one end of the duct will travel to the other by capillary action provided it does not have to climb an amount exceeding a certain limiting head during the travel. Such a duct is constituted by a shaft in a journal bearing.

(c) Any load carrying rotating shaft in an oil lubricated journal bearing takes up an eccentric position in the bearing such that pressure differences tend to be generated in the oil film in the bearing in a sense that would help the shaft to carry the load without metallic contact. If the bearing has an oil supply at one end only, these pressure differences cause some oil to be sucked into the bearing clearance on the non-load carrying side where the pressure in the oil film is low, and when this oil is carried round to the load carrying side of the bearing where the bearing clearance is becoming smaller and the pressure in the oil film is high, some of this oil is forced along the shaft in both directions—both back to the supply end and on to the other end. The general effect is a pumping action along the shaft which persists provided the oil is present in adequate supply at one end of the bearing only.

Applying these known principles to the illustrative embodiment herein, it will be seen that when groove 12 is full of oil and groove 14 is empty, all these effects $a$, $b$, and $c$ operate to cause oil to creep and work its way along the bearing from groove 12 to fill groove 14. When groove 14 contains oil, these same effects operate to promote the further flow of oil from groove 14 into fine side stage 3 of the pump and the oil flow from groove 12 to groove 14 continues for a time to replenish this loss from groove 14. As soon however as oil which has passed from groove 14 into pumping stage 3 begins to circulate back to groove 14 down duct 15 and to build up a small head in duct 15 a condition of equilibrium with regard to oil pressure and oil content becomes established in grooves 14 and 12 and no condition then exists to cause effects $a$, $b$ and $c$ to operate in one direction rather than in the other, hence all significant oil transfer between the grooves along the bearing will therefore cease.

Thus the loss in the quantity of oil circulating in the high vacuum stage is automatically replenished.

Although the invention has been described with reference to a two-stage mechanical vacuum pump, it will be understood that the invention may be applied to any or all of the stages except the highest pressure stage, of a multi-stage pump thereby producing a progressively purifying or fractionating effect as the discrete oil quantities segregated in each successive stage are subjected to lower interstage purging and de-gassing pressures.

It will be further understood that the invention is not limited to the above described specific construction. Obviously other specific arrangements are possible for lubricating and sealing a stage of a multi-stage mechanical vacuum pump by means of a discrete quantity of oil which is segregated in the stage and is not changed or augmented unless losses in the said discrete quantity of oil makes necessary the supply of additional oil, the said supply of additional oil being effected automatically and stopping as soon as sufficient oil has been supplied to make up the losses.

I claim:

1. An oil-sealed rotary vacuum pump having a low-vacuum stage and a high vacuum stage, said pump comprising a housing having therein a low vacuum pumping chamber and a high vacuum pumping chamber, rotary displacing means in each of said chambers and providing therewith said low-vacuum and high vacuum stages, respectively, and means connected to said displacing means for driving the same; said pump having an inlet leading to said high vacuum pumping chamber, an interstage transfer duct leading from said high vacuum pumping chamber to said low vacuum pumping chamber, an outlet leading from said low vacuum pumping chamber, an oil reservoir positioned above said chambers for containing oil for lubricating and sealing the working surfaces of the pump, said outlet opening into said oil reservoir, oil duct means leading from said reservoir to working surfaces of said low vacuum pumping stage for supplying lubricating and sealing oil thereto, an oil flow path leading to said high vacuum pumping chamber from a region in said low vacuum pumping chamber that is at a pressure intermediate atmospheric pressure and the interstage pressure of the pump, said oil flow path comprising means forming a first pressure region and duct means connecting with said first pressure region and with a region of said pump maintained at the interstage pressure of the pump for applying to said first pressure region a pressure corresponding to said interstage pressure; oil duct means separate from said reservoir and having communication from and to said high vacuum pumping chamber for receiving oil delivered from said high vacuum pumping chamber and returning it thereto, and means connected with said separate oil duct means and responsive to the quantity of oil in said separate oil duct means for admitting flow of oil from said first pressure region to said separate oil duct means only on depletion of the quantity of oil in said separate oil duct means.

2. An oil-sealed rotary vacuum pump according to claim 1, said means responsive to the quantity of oil in said separate oil duct means comprising means defining a second pressure region in said oil flow path between said first pressure region and said high vacuum pumping chamber, and means connected with said second pressure region and with said transfer duct for applying to said second pressure region a pressure corresponding to the pressure in said transfer duct augmented by a pressure corresponding to the quantity of oil in said separate oil duct means.

3. An oil-sealed rotary vacuum pump according to claim 2, said transfer duct being positioned above said oil flow path, and said separate oil duct means comprising an oil sump formed in said transfer duct for receiving oil delivered thereto from said high vacuum pumping chamber and a duct extending downwardly from said sump and communicating at its lower end with said second pressure region, thereby providing a second path for circulating oil delivered from said high vacuum pumping chamber through said sump and downwardly extending duct to said second pressure region and thence along said first mentioned oil flow path to said high vacuum pumping chamber, the quantity of oil in said downwardly extending duct establishing a head of oil therein proportional to the quantity of oil circulating in said second path and thereby creating at said second pressure region a pressure equal to the pressure in said transfer duct augmented by the pressure of said head of oil.

4. An oil-sealed rotary vacuum pump according to claim 2, said pump comprising a common bearing positioned between said low and high vacuum pumping chambers, shaft means interconnecting the rotary displacing members in said high and low pressure pumping chambers and journalled in said common bearing, said shaft means and bearing defining said first mentioned oil flow path, and the means defining said first and second pressure regions comprising first and second annular channels surrounding said shaft means and mutually spaced lengthwise of said bearing.

5. A multi-stage vacuum pumping system comprising a higher pressure stage and a lower pressure stage connected for delivering gases thereto, oil circulating means connected to said higher pressure stage for circulating lubricating and sealing oil through said higher pressure stage, separate oil circulating means connected to said lower pressure stage for circulating through said lower pressure stage a body of oil segregated with respect to said high pressure stage oil circulation except upon depletion of oil in said body, an oil flow path for supply of make-up oil to said lower pressure stage, said path extending thereto from a region in said higher pressure stage that is subject to a pressure intermediate atmospheric pressure and the interstage pressure of the pumping system, and means connected to said separate circulating means and to said oil flow path and responsive to decrease and increase of the quantity of oil in said segregated body for permitting and preventing, respectively, the flow of make-up oil to said lower pressure stage through said path.

6. A multi-stage vacuum pumping system according to claim 5, said last-named means comprising a downwardly extending duct in which said segregated body of oil maintains a hydrostatic head constituting a measure of the quantity of oil in said segregated body, and means connected with and responsive to said hydrostatic head for permitting and preventing said flow of make-up oil.

References Cited in the file of this patent
UNITED STATES PATENTS

| | | |
|---|---|---|
| 2,215,256 | Stoltz | Sept. 17, 1940 |
| 2,337,849 | Dubrovin | Dec. 28, 1943 |
| 2,451,098 | La Brecque et al. | Oct. 12, 1948 |
| 2,668,655 | Bowering | Feb. 9, 1954 |